United States Patent
Kim

(10) Patent No.: US 7,321,393 B2
(45) Date of Patent: Jan. 22, 2008

(54) METHOD OF CONTROLLING OPERATION OF A DIGITAL CAMERA TO TAKE AN IDENTIFICATION PHOTOGRAPH

(75) Inventor: Min-ju Kim, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 738 days.

(21) Appl. No.: 10/716,009

(22) Filed: Nov. 18, 2003

(65) Prior Publication Data

US 2004/0100572 A1    May 27, 2004

(30) Foreign Application Priority Data

Nov. 25, 2002  (KR) ..................... 10-2002-0073473

(51) Int. Cl.
*H04N 5/222* (2006.01)
(52) U.S. Cl. ................................. 348/333.03
(58) Field of Classification Search ............. 348/333.1, 348/586–588, 333.03; 382/199, 266, 2, 266.2
See application file for complete search history.

(56) References Cited

U.S. PATENT DOCUMENTS

| | | | |
|---|---|---|---|
| 5,293,380 A | * | 3/1994 | Kondo ....................... 370/337 |
| 5,978,519 A | * | 11/1999 | Bollman et al. ............ 382/282 |
| 6,366,316 B1 | | 4/2002 | Paruski et al. |
| 6,907,136 B1 | * | 6/2005 | Shigemori .................. 382/118 |
| 6,999,113 B1 | * | 2/2006 | Omura ..................... 348/207.2 |
| 2002/0070945 A1 | * | 6/2002 | Kage .......................... 345/581 |
| 2002/0171746 A1 | * | 11/2002 | Stephany et al. ........... 348/239 |

FOREIGN PATENT DOCUMENTS

| JP | 06-319130 A | 11/1994 |
|---|---|---|
| KR | 1999-007059 A | 1/1999 |

* cited by examiner

*Primary Examiner*—David Ometz
*Assistant Examiner*—Tuan Le
(74) *Attorney, Agent, or Firm*—Drinker Biddle & Reath LLP

(57) ABSTRACT

Provided is a method of controlling the operation of a digital camera to order to take an identification photograph in a natural setting by displaying a frame and a reference outline of the identification photograph, performing photographing according to a photographing signal by a user, displaying a detection area to detect an outline of a figure around the reference outline on a photographed image, detecting the outline of the figure in the detection area, and forming a background image for the identification photograph in a set background area with respect to the detected outline.

12 Claims, 12 Drawing Sheets

METHOD OF CONTROLLING OPERATION OF A DIGITAL CAMERA TO TAKE AN IDENTIFICATION PHOTOGRAPH

BACKGROUND OF THE INVENTION

This application claims the priority of Korean Patent Application No. 2002-73473, filed on 25 Nov. 2002, in the Korean Intellectual Property Office, the disclosure of which is incorporated herein in its entirety by reference.

1. Field of the Invention

The present invention relates to a method of controlling operation of a digital camera, and more particularly, to a method of controlling operation of a digital camera to take an identification photograph in a natural setting.

2. Description of the Related Art

Owing to the recent development of digital cameras, a user can take an identification photograph in a natural setting by using a digital camera. For example, U.S. Pat. No. 6,366,316 discloses a technology which enables taking an identification photograph in a natural setting according to the following steps.

First, a first image including a figure and a second image having only a background exists are obtained by taking a photograph when the digital camera is fixed on a tripod.

Second, data of the auxiliary pixels having the same gradation data as those of the second image are initialized with respect to auxiliary pixels of the first image. Accordingly, a background area except for a figure area is detected so that the detected background area can be deleted.

Third, a set background image previously stored in the digital camera and selected by a user is inserted in the deleted background area. Accordingly, the set background image can be formed in the background area of the first image.

However, according to a conventional method of controlling the operation of the digital camera, the user inconveniently needs to take photographs two times by using the tripod.

SUMMARY OF THE INVENTION

To solve the above and other problems, the present invention provides a method of controlling the operation of a digital camera so that an identification photograph can be easily taken in a natural setting.

An aspect of the present invention provides a method of controlling operation of a digital camera to take an identification photograph in a natural setting, which comprises displaying a frame and a reference outline of the identification photograph, performing photographing according to a photographing signal by a user, displaying a detection area to detect an outline of a figure around the reference outline on a photographed image, detecting the outline of the figure in the detection area, and forming a background image for the identification photograph in a set background area with respect to the detected outline.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
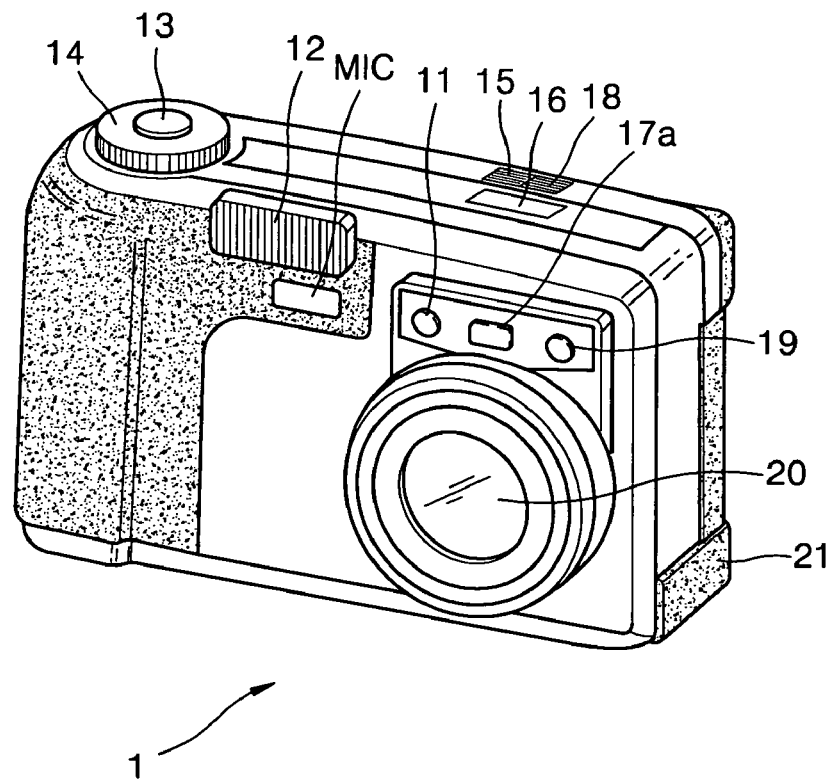
FIG. 1 is a perspective view illustrating the front and upper surfaces of a digital camera according to a preferred embodiment of the present invention.

Referring to FIG. 1, a microphone MIC, a self-timer lamp 11, a flash 12, a shutter button 13, a mode dial 14, a function selection button 15, a photographing information display portion 16, a viewfinder 17a, a function block button 18, a flash light amount sensor 19, a lens portion 20, and an external interface portion 21 are provided on the front and upper surfaces of a digital camera 1 according to a preferred embodiment of the present invention.

The self-timer lamp 11 flickers in a self-timer mode during a set time after the shutter button 13 is pressed until the photographing starts. The mode dial 14 is used by a user to set a variety of modes, for example, a still image photographing mode, a night view photographing mode, a motion picture photographing mode, a reproduction mode, a computer connection mode, and a system setting mode. The function selection button 15 is used to select one of the operational modes of the digital camera 1, for example, the still image photographing mode, the night view photographing mode, the motion picture photographing mode, and the reproduction mode. The photographing information display portion 16 displays information of the respective functions related to photographing. The function block button 18 is used to select each function displayed on the photographing information display portion 16.

Figure 2:
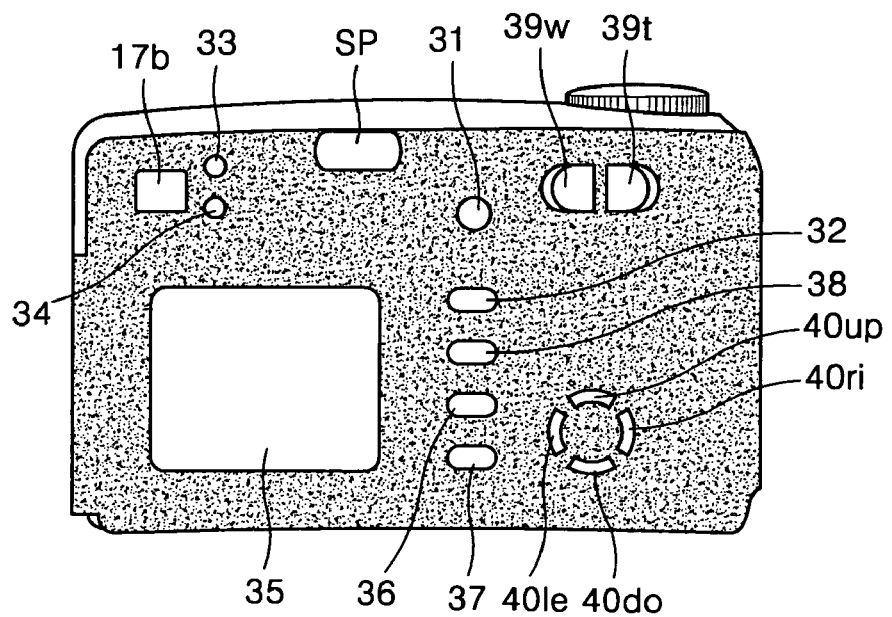
FIG. 2 is a rear view of the digital camera of FIG. 1.

Referring to FIG. 2, a speaker SP, a power button 31, a monitor button 32, an auto-focus lamp 33, a viewfinder 17b, a flash ready lamp 34, a display panel 35, a confirm/delete button 36, an enter/reproduce button 37, a menu button 38, a wide angle zoom button 39w, a telephoto zoom button 39t, an upward movement button 40up, a rightward movement button 40ri, a downward movement button 40do, and a leftward movement button 40le are arranged on the rear side of the digital camera 1 according to the present invention.

The monitor button 32 is used to control the operation of the display panel 35. For example, when the monitor button 32 is first pressed, an image of an object pictured and photographing information thereof are displayed on the display panel 35. When the monitor button 32 is second pressed, only an image of the pictured object is displayed on the display panel 35. When the monitor button 32 is third pressed, power applied to the display panel 35 is cut off. The auto-focus lamp 33 is operated when an input image is well focused. The flash ready lamp 34 is operated when the flash 12 of FIG. 1 is in a ready mode. The confirm/delete button 36 is used as a confirm button or a delete button in the process in which the user sets each mode. The enter/reproduce button 37 is used for the user to input data or for the function of stop or reproduction in a reproduction mode. The menu button 38 is used to display menu of a mode selected by the mode dial 14. The upward movement button 40$up$, the rightward movement button 40$ri$, the downward movement button 40$do$, and the leftward movement button 40$le$ are used in the process in which the user sets each mode.

The overall structure of the digital camera of FIG. 1 is described with reference to FIG. 3.

An optical system OPS, including a lens portion and a filter portion, optically processes light from an object. The lens portion in the optical system OPS includes a zoom lens, a focus lens, and a compensation lens.

An optoelectric converting portion OEC of a charge coupled device (CCD) or complementary metal-oxide-semiconductor (CMOS) converts light from the optical system OPS to an electric analog signal. A digital signal processor (DSP) 507 controls the operation of the optoelectric converting portion OEC and an analog-to-digital converting portion, using a timing circuit 502. A correlation double sampler and analog-to-digital converter (CDS-ADC) device 501 as the analog-to-digital converting portion processes an analog signal from the optoelectric converting portion OEC to remove a high frequency noise and adjust amplitude thereof, and converts the processed analog signal to a digital signal. The DSP 507 controlled by the microcontroller 512 generates a digital image signal classified by brightness and chromaticity signals, by processing the digital signal from the CDS-ADC device 501. Reference numeral 503 denotes a real time clock (RTC).

The digital image signal from the DSP 507 is temporarily stored in a dynamic random access memory (DRAM) 504. The algorithm and set data needed for the operation of the DSP 507 is stored in an erasable programmable read-only memory (EPROM) 505. A memory card of a user is inserted in or detached from a memory card interface 506.

A digital image signal from the DSP 507 is input to a LCD driving portion 514 so that an image is displayed on the color LCD panel 35.

The digital image signal from the DSP 507 can be transmitted through a USB (universal serial bus) connection portion 21$a$ and an RS232C interface 508 and a connection portion 21$b$ thereof, as a serial communication, and a video filter 509 and a video output portion 21$c$, as a video signal.

An audio processor 513 outputs a voice signal from a microphone MIC to the DSP 507 or the speaker SP and outputs an audio signal from the DSP 507 to the speaker SP.

Figure 3:
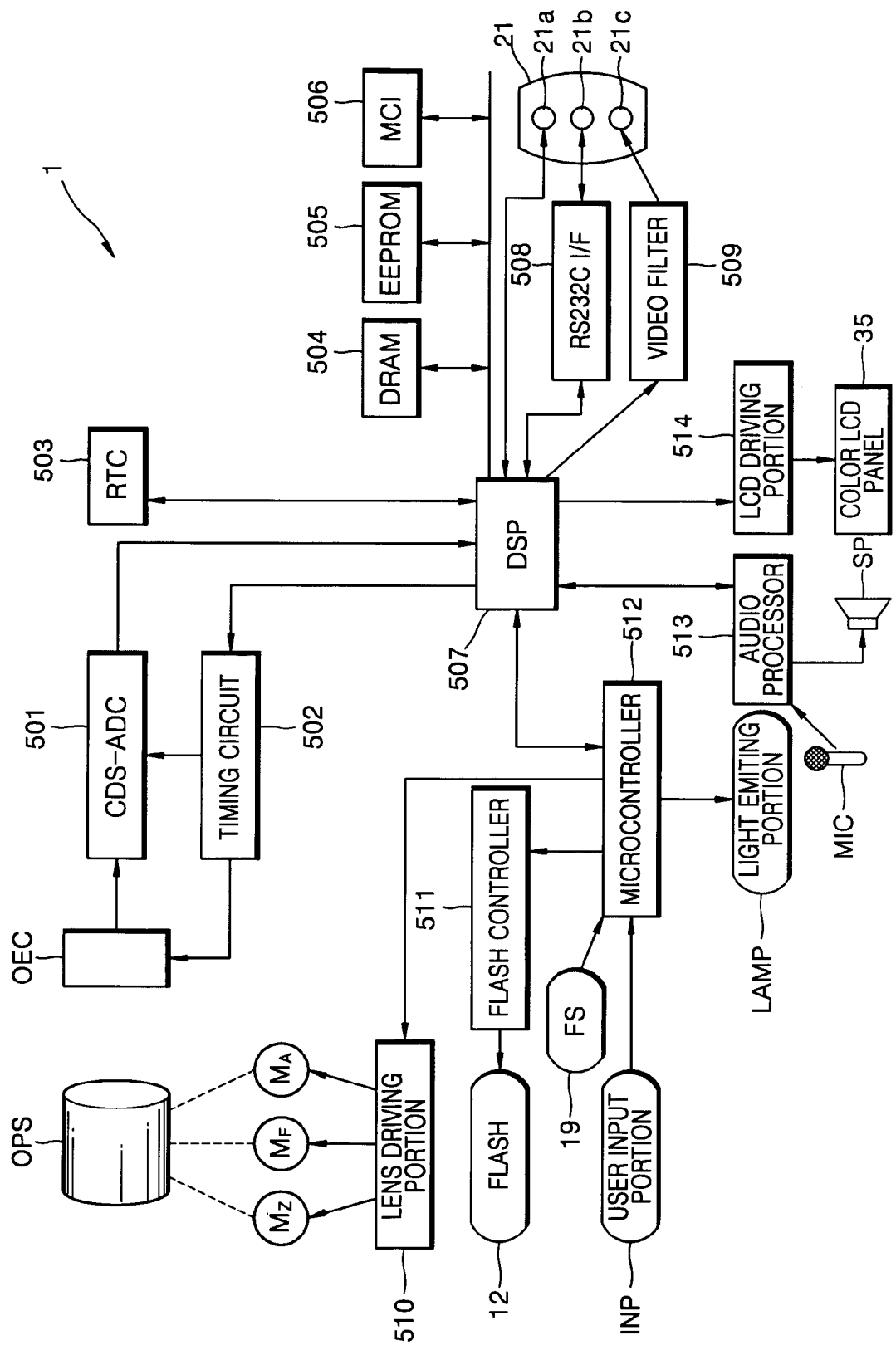
FIG. 3 is a block diagram illustrating the overall configuration of the digital camera of FIG. 1.

The user input portion INP includes the shutter button 13 of FIG. 3, the mode dial 14 of FIG. 3, the function selection button 15 of FIG. 3, the function block button 18 of FIG. 3, the monitor button 32 of FIG. 2, the confirm/delete button 36 of FIG. 2, the enter/play button 37 of FIG. 2, the menu button 38 of FIG. 2, the wide angle zoom button 39$w$ of FIG. 2, the telephoto zoom button 39$t$ of FIG. 2, the up movement button 40$up$ of FIG. 2, the right movement button 40$ri$ of FIG. 2, the down movement button 40$do$ of FIG. 2, and the left movement button 40$le$ of FIG. 2.

The microcontroller 512 controls the lens driving portion 510 and accordingly the zoom motor $M_Z$, the focus motor $M_F$, and the aperture motor $M_A$ respectively drive the zoom lens, the focus lens, and the aperture in the optical system OPS. A light emitting portion LAMP driven by the microcontroller 512 includes the self-timer lamp 11, the auto focus lamp 33, and a flash ready lamp 34. The microcontroller 512 controls the operation of the flash controller 511 according to the signal from the flash light amount sensor 19.

Figure 4A:
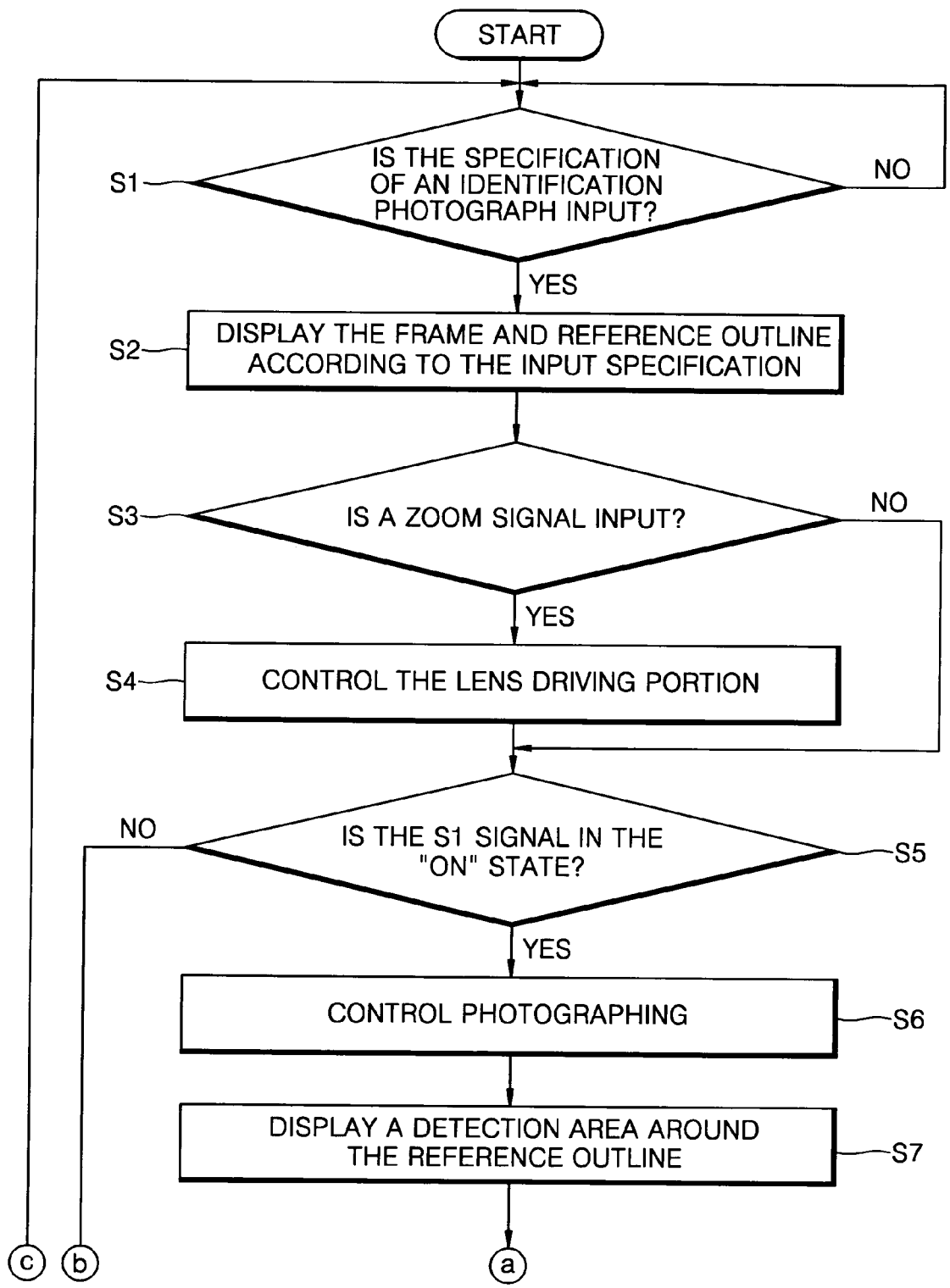
FIGS. 4A and 4B are flow charts for explaining a control algorithm executed by a microcontroller of FIG. 3 in an operation mode to take an identification photograph outdoors.
Figure 4B:
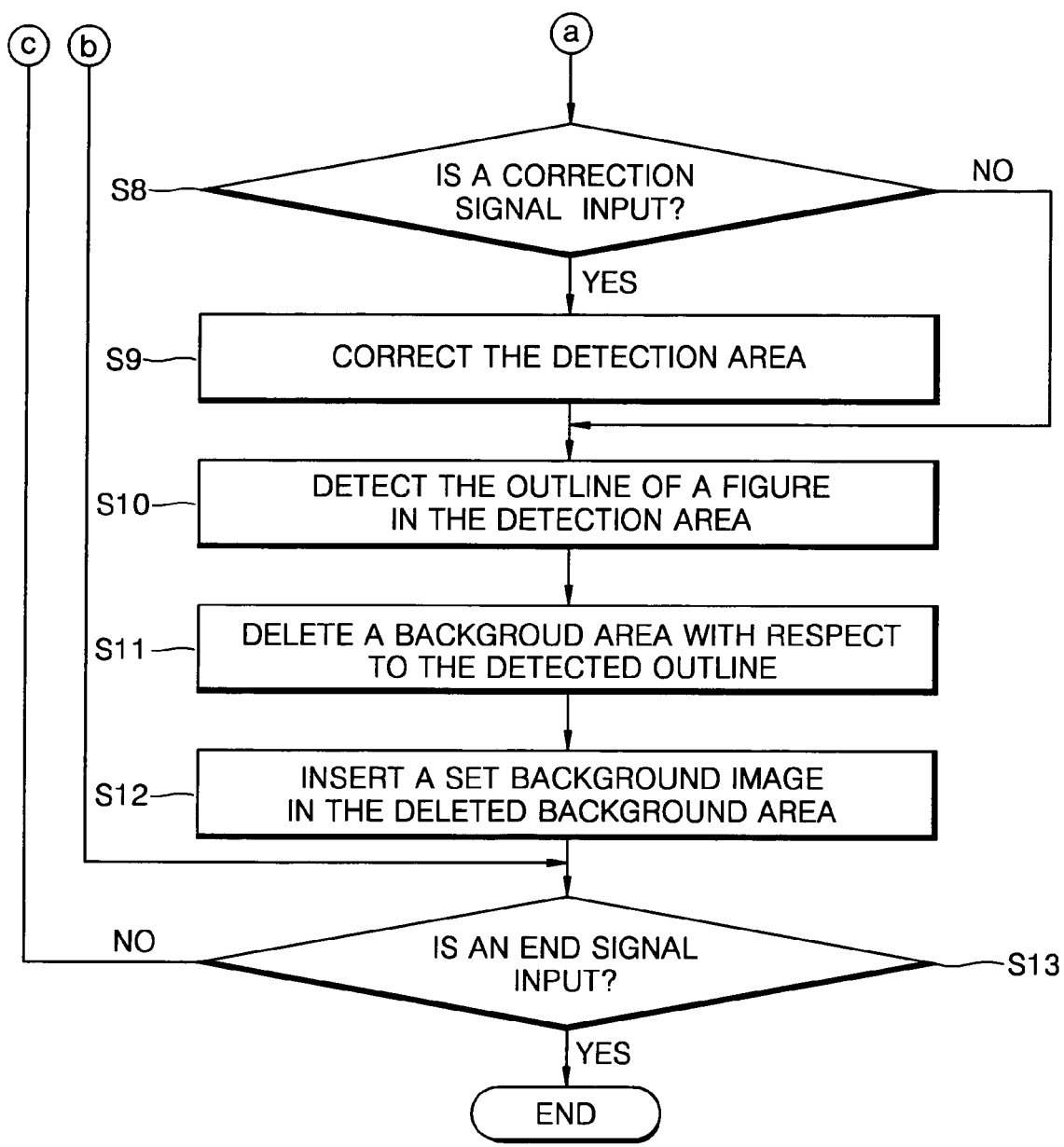
Figure 5:
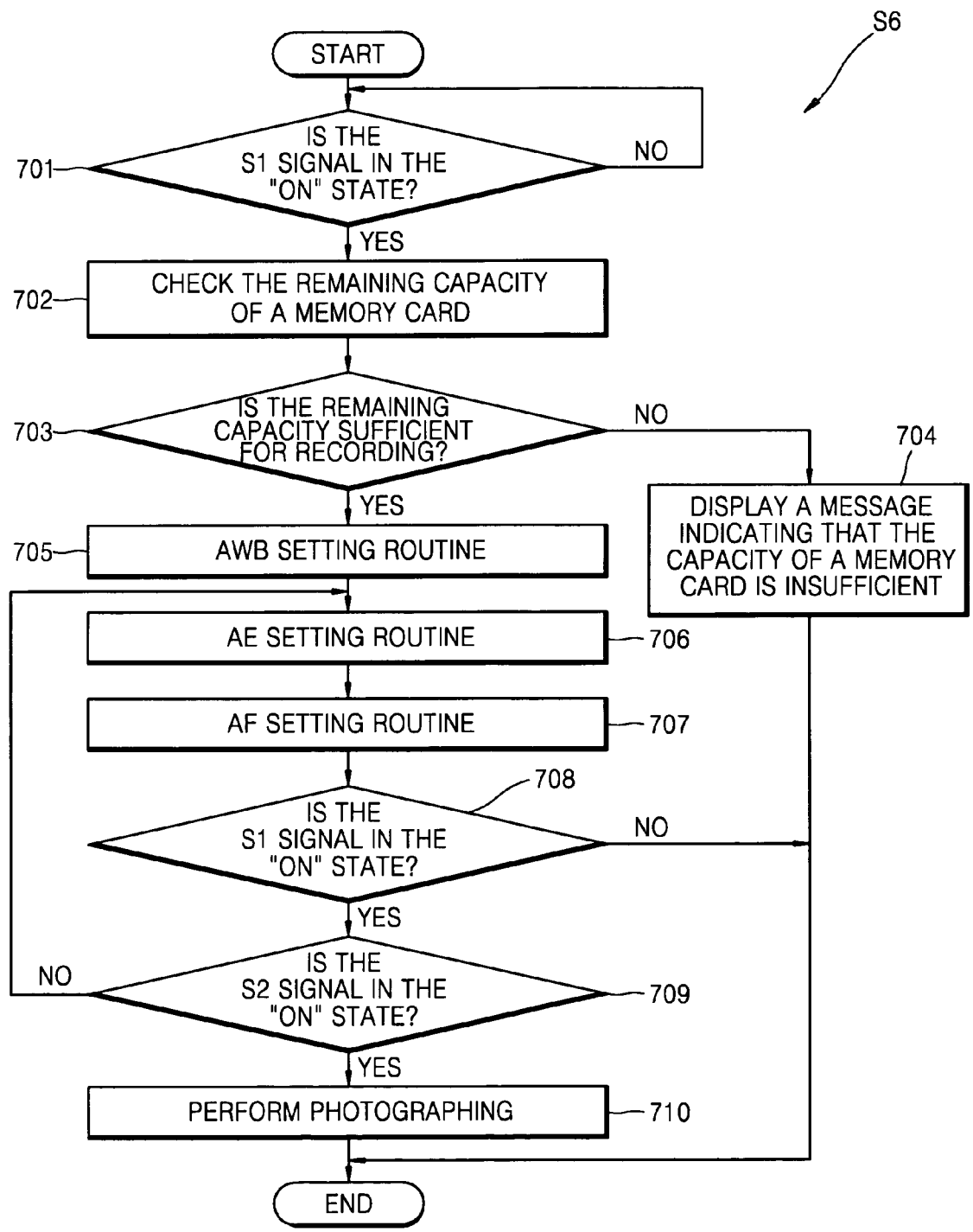
FIG. 5 is a flow chart for explaining a detailed algorithm of the photographing control step of FIG. 4A.
Figure 6A:
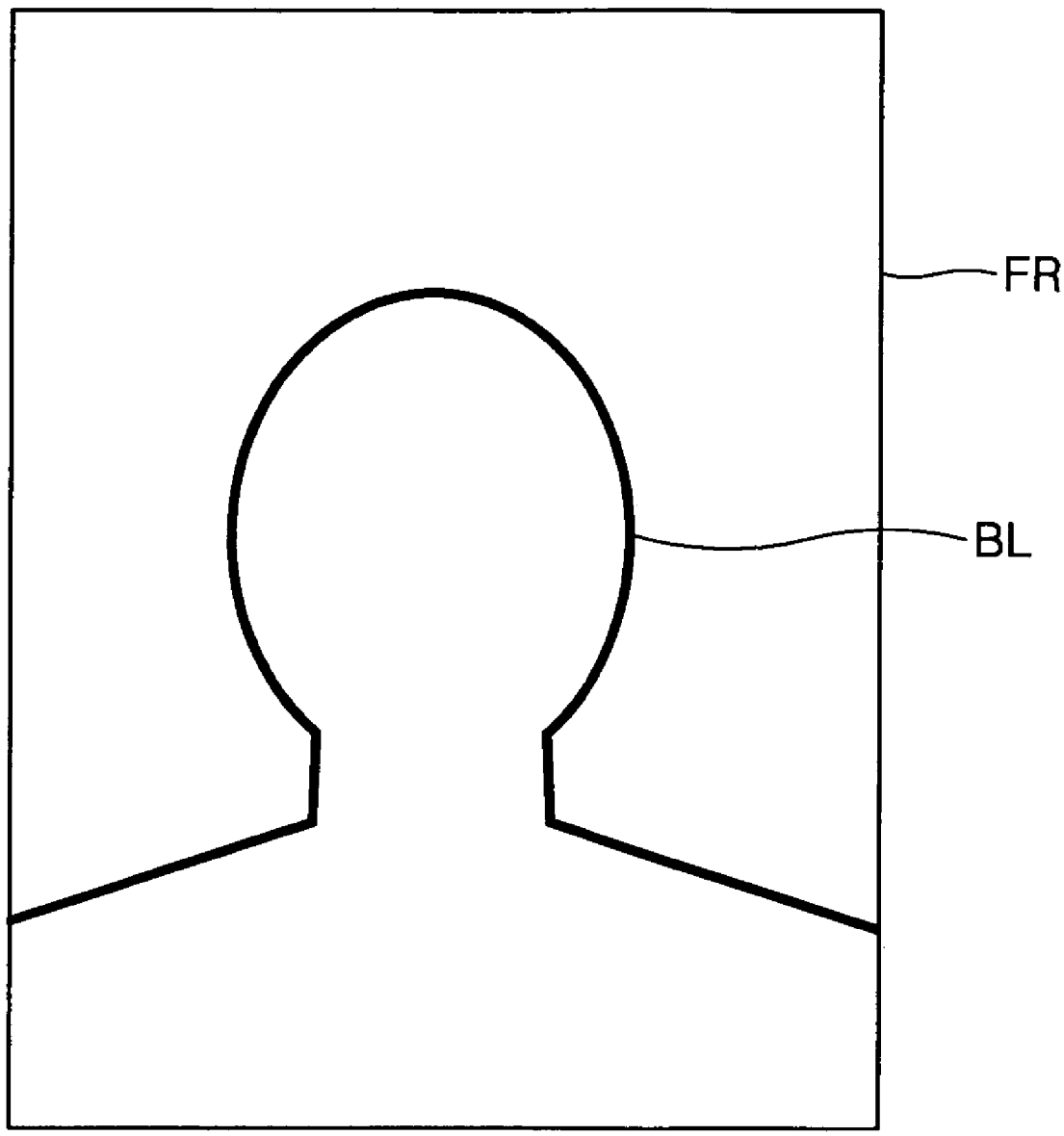
FIGS. 6A and 6B are views illustrating images displayed on a color LCD panel as Step S2 of FIG. 4A is executed.
Figure 6B:
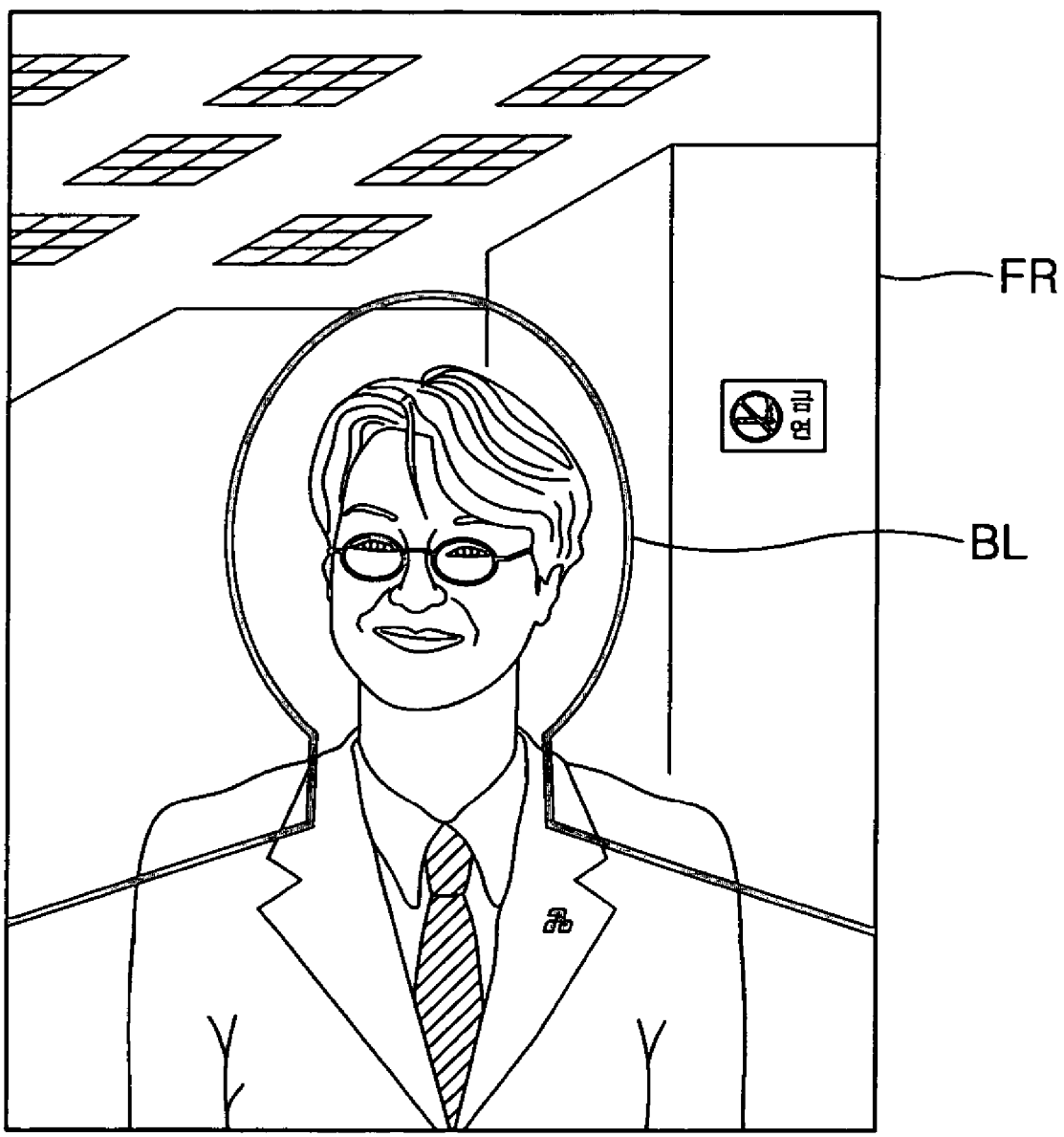
Figure 6C:
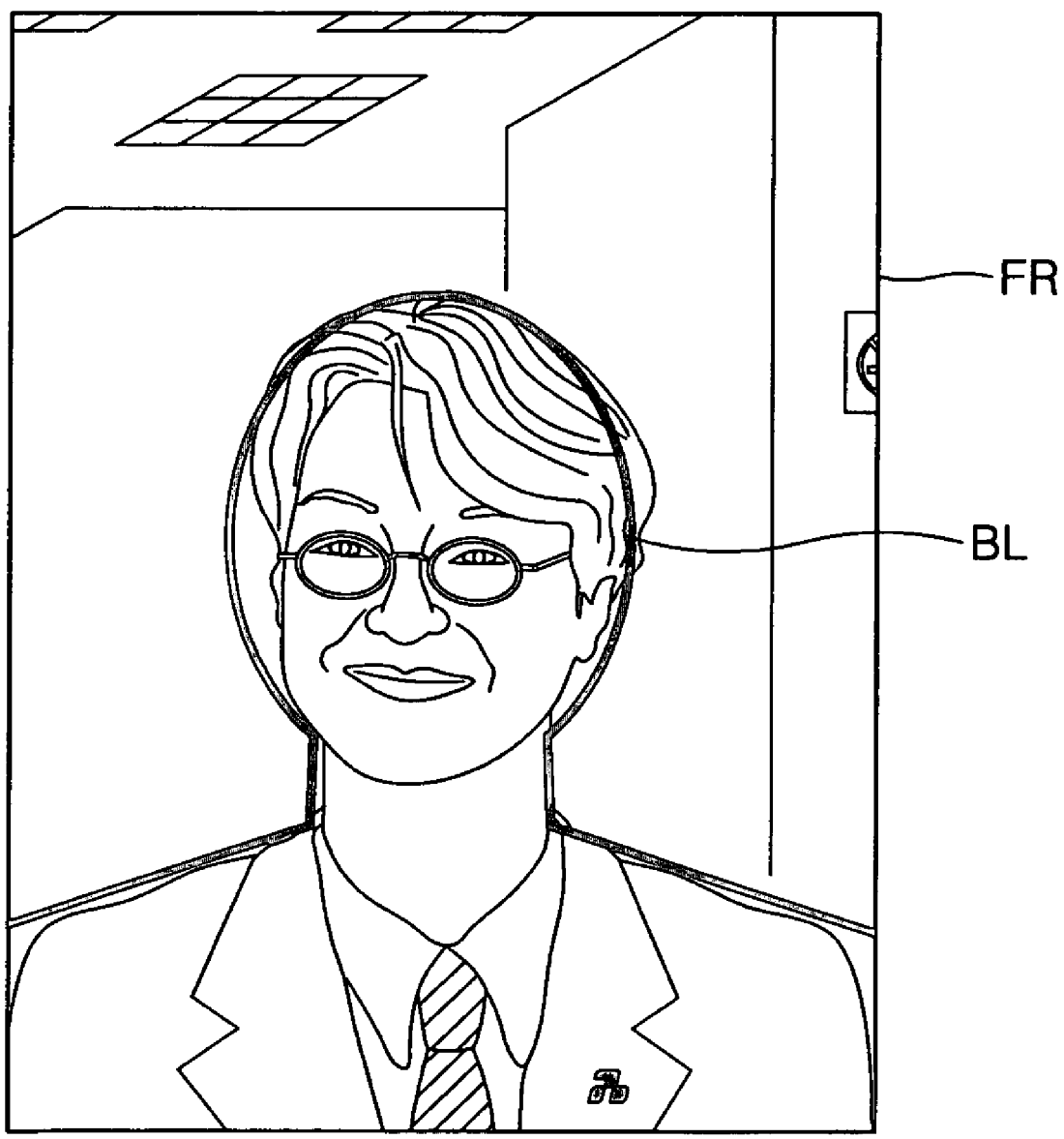
FIG. 6C is a view illustrating an image displayed on a color LCD panel as Step S4 of FIG. 4A is executed.
Figure 6D:
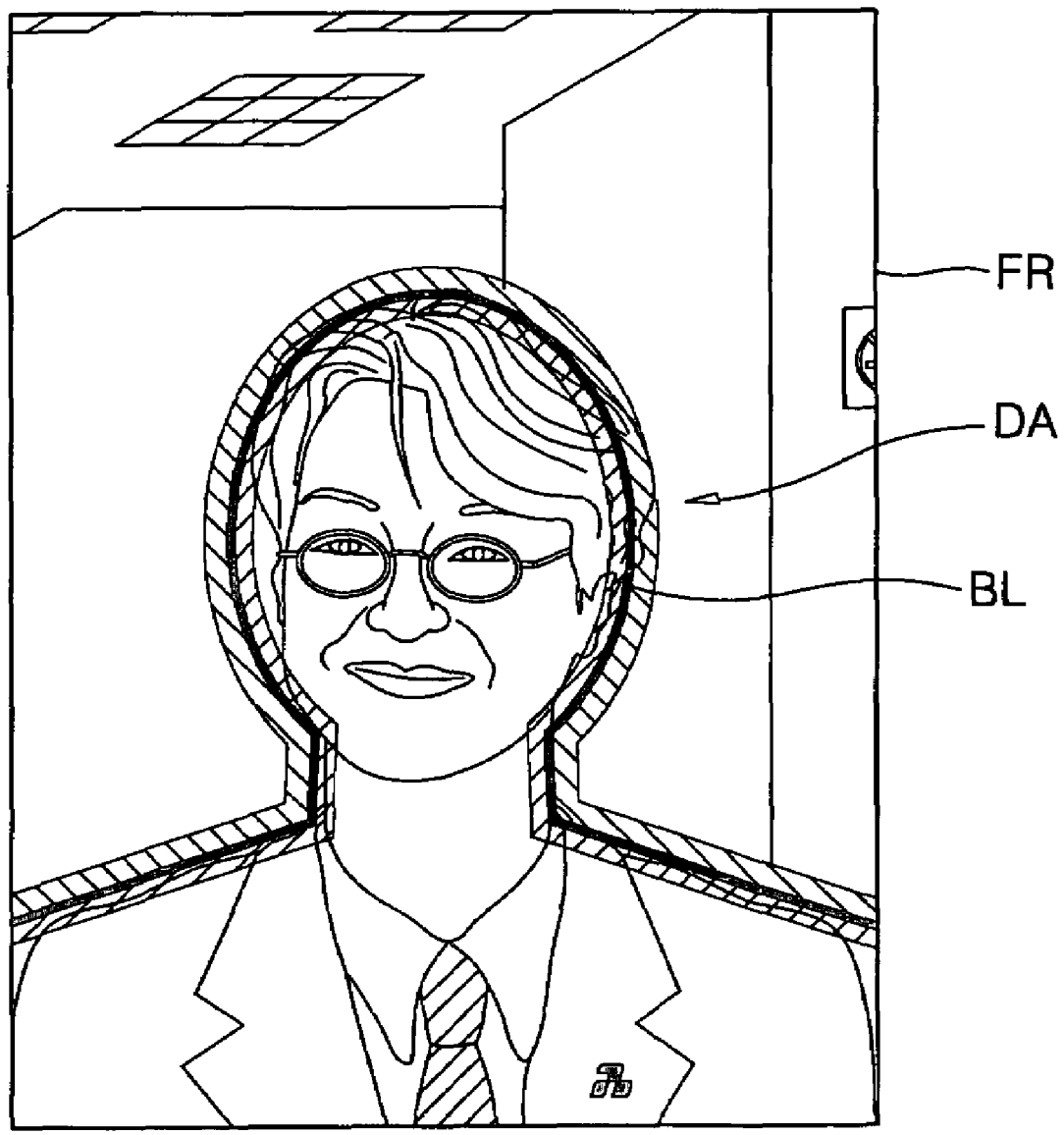
FIG. 6D is a view illustrating an image displayed on a color LCD panel as Step S7 of FIG. 4A is executed.
Figure 6E:
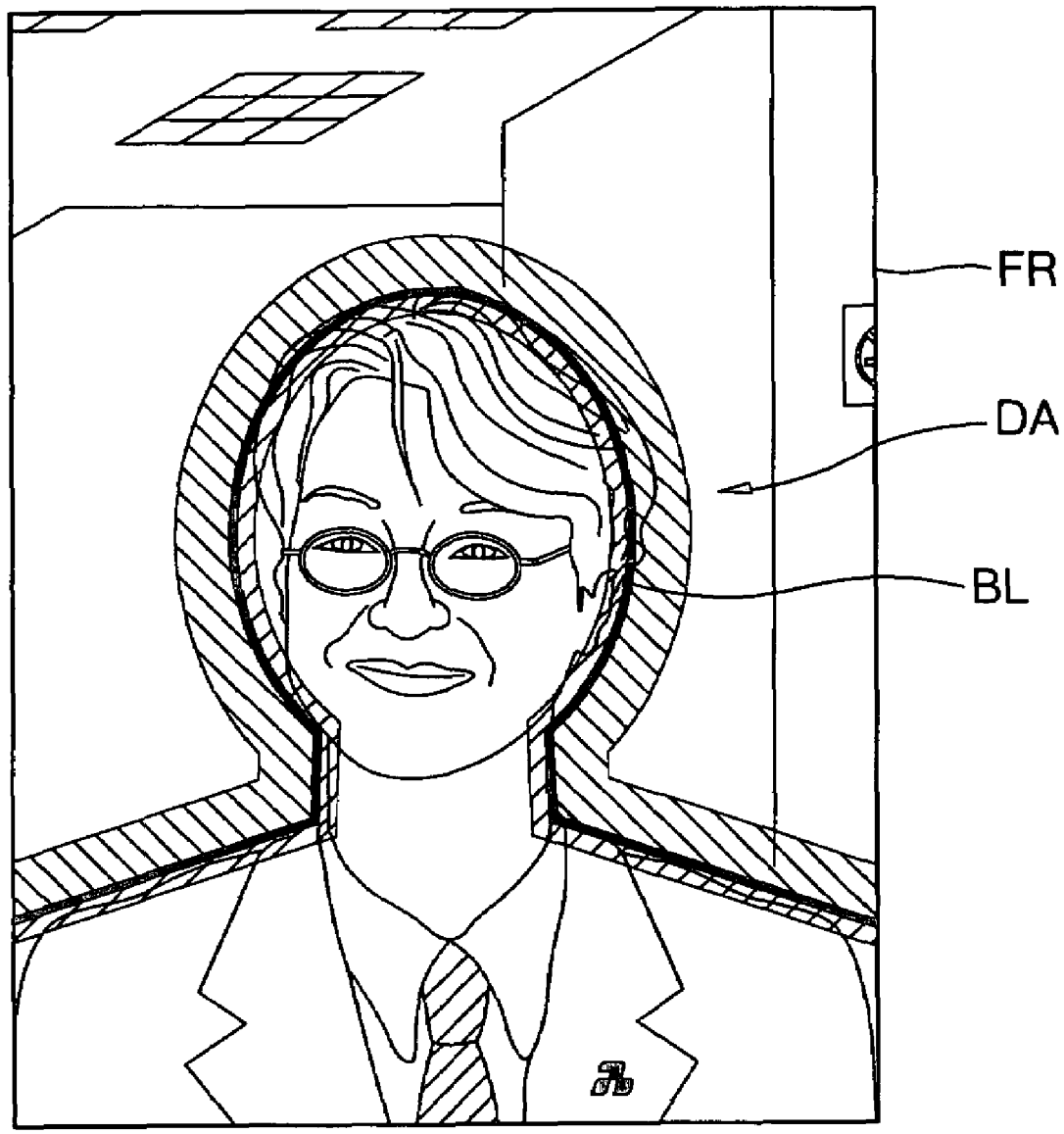
FIG. 6E is a view illustrating an image displayed on a color LCD panel as Step S9 of FIG. 4A is executed.
Figure 6F:
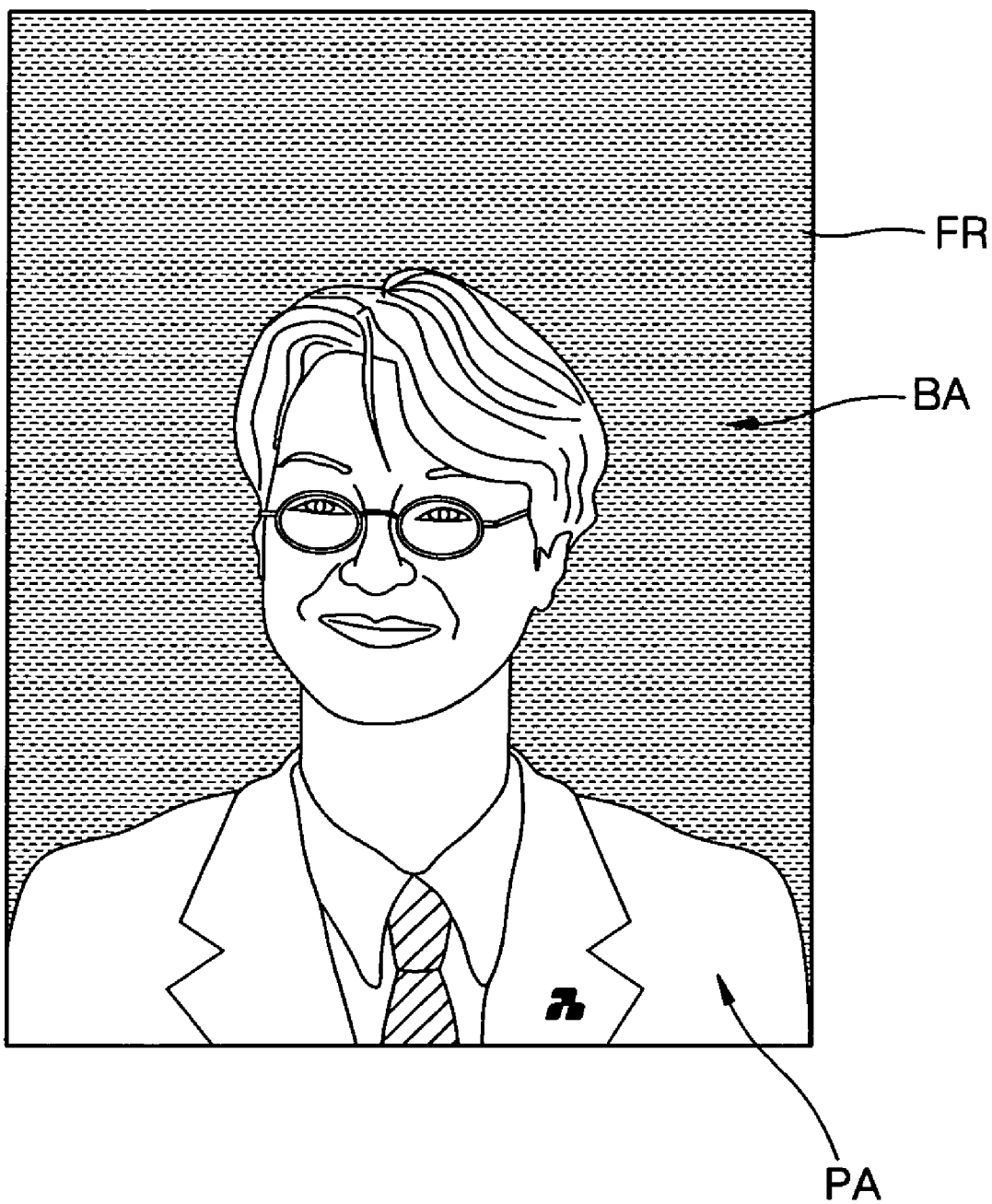
FIG. 6F is a view illustrating an image displayed on a color LCD panel as Step S11 of FIG. 4A is executed.
Figure 6G:
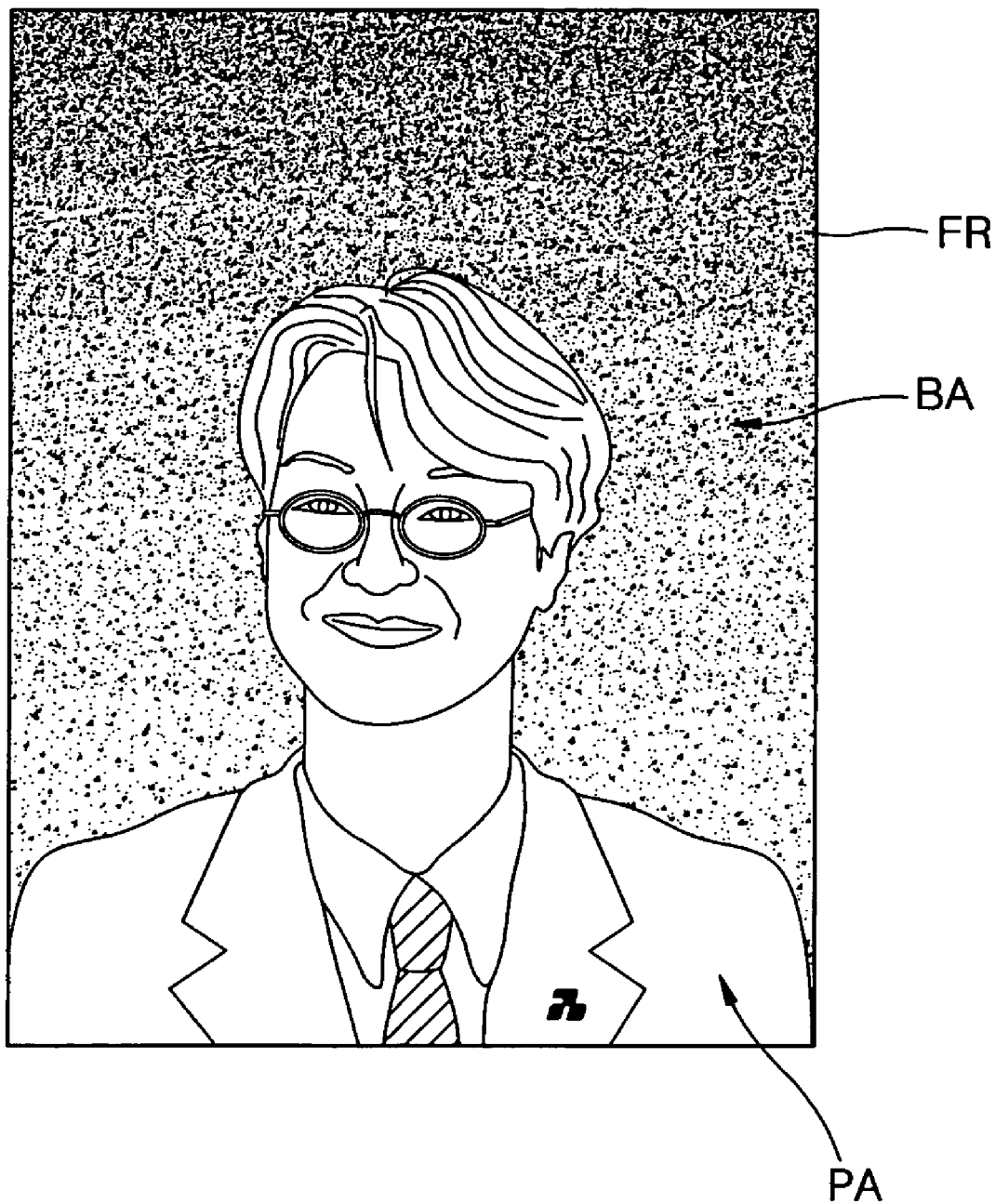
FIG. 6G is a view illustrating an image displayed on a color LCD panel as Step S12 of FIG. 4A is executed.

FIGS. 4A and 4B show a control algorithm executed by the 512 of FIG. 3 in an operation mode to take an identification photograph outdoors. FIG. 5 shows a detailed algorithm of the photographing control step of FIG. 4A. FIGS. 6A and 6B show images displayed on a color LCD panel as Step S2 of FIG. 4A is executed. FIG. 6C shows an image displayed on a color LCD panel as Step S4 of FIG. 4A is executed. FIG. 6D shows an image displayed on a color LCD panel as Step S7 of FIG. 4A is executed. FIG. 6E shows an image displayed on a color LCD panel as Step S9 of FIG. 4A is executed. FIG. 6F shows an image displayed on a color LCD panel as Step S11 of FIG. 4A is executed. FIG. 6G shows an image displayed on a color LCD panel as Step S12 of FIG. 4A is executed.

Referring to FIGS. 1 through 6G, a control algorithm executed by the microcontroller 512 of FIG. 3 in an operation mode to take an identification photograph outdoors is described below. First, a user inputs one of a variety of specifications for an identification photograph, for example, a card-size specification, a half card-size specification, or a passport specification (Step S1). Next, as shown in FIGS. 6A and 6B, a frame FR and a reference outline BL corresponding to the input specification are displayed on the color LCD panel 36 (Step S2). The frame FR and reference outline BL may consist of a variety of shapes and sizes, depending on the specification selected. FIG. 6A shows the digital camera 1 not directed to an object figure, while FIG. 6B shows that the user has directed the digital camera 1 toward an object figure.

When a zoom signal is output from the wide angle zoom button 39$w$ or 39$t$ of the user input portion INP (Step S3), the lens driving portion 510 is controlled accordingly (Step S4). That is, as shown in FIG. 6C, the user operates the wide angle zoom button 39$w$ or the telephoto zoom button 39$t$ to match the outline of the object figure with respect to the reference outline BL.

When an S1 signal is turned on (Step S5), a photographing control (Step S6) is performed based on the algorithm of FIG. 5. The shutter button 13 included in the user input portion INP is a two-step structure. That is, when the user operates the wide angle zoom button 39$w$ and the telephoto zoom button 39$t$ and presses the shutter button 13 to a first step, the S1 signal from the shutter button 13 is turned on. When the user presses the shutter button 13 to a second step, an S2 signal is turned on. Thus, the photographing control algorithm of FIG. 5 is initiated when the user presses the shutter button 13 to the first step (Step 701). In the algorithm of the photographing control (Step S6), first, when the S1 signal is turned on (Step S5), the remaining capacity of the memory card is checked (Step 702). Whether the remaining capacity is sufficient for recording is checked (Step 703). If the remaining capacity is not sufficient for recording, a message is displayed indicating that the amount of the memory card is insufficient (Step 704). If the remaining capacity is sufficient for recording, first, an automatic white balance (AWB) mode is executed to set related parameters (Step 705). Then, an automatic exposure (AE) mode is executed so that the amount of exposure light with respect to incident brightness is calculated and the aperture driving motor $M_A$ is driven according to the calculated amount of exposure light (Step 706). Next, an automatic focusing mode is executed so that the present position of the focus lens FL is set (Step 707). Whether the S1 signal which is a first step signal output from the shutter button 13 is still in an "ON" state is checked (Step 708). If the S1 signal is still in the "ON" state, whether the S2 signal is turned on is checked (Step 709). If the S1 signal is not in the "ON" state, which means that the user does not press the shutter button 13 to the second step for photographing, the algorithm proceeds to Step 706. If the S1 signal is in the "ON" state, which means that the user presses the shutter button 13 to the second step, photographing is performed (step 710). That is, the digital signal processor 507 is operated by the microcontroller 512 and the optoelectric converting portion OEC and the CDS-ADC device 501 are operated by the timing circuit 502.

When the photographing control (Step S6) is completed, as shown in FIG. 6D, a detection area DA to detect the outline of the object figure is displayed around the reference outline BL (Step S7). Next, when a correction signal is received from the user input portion INP (Step S8), the detection area DA is corrected accordingly (refer to FIG. 6E; Step S9). For example, when a right or left signal is received from the rightward movement button 40*ri* or leftward movement button 40*le* of the user input portion INP, the detection area DA is enlarged (refer to FIG. 6E) or contracted. When an up or down signal is received from the 40*up* or 40*do* of the user input portion INP, the detection area DA is moved upward or downward. Of course, it is possible that, when a right or left signal is received from the rightward movement button 40*ri* or the leftward movement button 40*le* of the user input portion INP, the detection area DA may be moved right or left. In this case, the detection area DA can be enlarged (refer to FIG. 6E) or contracted by other keys of the user input portion INP. For reference, FIG. 6E shows that there is a need to further adjust the detection area DA.

The outline of the object figure may be included in the detection area DA through the adjustment of the detection area DA by the user. Accordingly, the outline of the figure is detected from pixels having a relatively greater gradation difference among pixels in the detection area DA (Step S10). Next, as shown in FIG. 6F, the reference outline BA is deleted with respect to the detected outline of the figure (Step S11). As shown in FIG. 6G, a background image set to be used for the background of an identification photograph is inserted in the deleted reference outline BA (Step S12).

The above all steps are repeated until an external end signal, for example, an end signal by switching the operation mode is input (Step S13).

While this invention has been particularly shown and described with reference to preferred embodiments thereof, it will be understood by those skilled in the art that various changes in form and details may be made therein without departing from the spirit and scope of the invention as defined by the appended claims.

As described above, in the method of controlling a digital camera according to the present invention, a user can take a photograph by roughly matching the outline of the object figure according to the reference outline BL. Therefore, the outline of the object figure is detected from the pixels having a relatively higher gradation difference among the pixels in the vertical direction in the detection area DA around the reference outline BL, so that a background image for an identification photograph is formed and an identification photograph is obtained by taking a photograph in a natural setting once without using a tripod.

What is claimed is:

1. A method of controlling operation of a digital camera to take an identification photograph in a natural setting, the method comprising:

displaying a frame and a reference outline in a display unit;

performing photography;

displaying a detection area adjacent to the reference outline; and the detection area encompasses the reference outline, such that a portion of the detection area is within an area defined by the reference outline, and another portion of the detection area is outside of the area defined by the reference outline.

2. The method of claim 1, wherein the method further comprises:

deleting a background area of the photographed image with respect to the detected outline.

3. The method of claim 2, wherein the method further comprises:

inserting a background image for the identification photograph in the deleted background area.

4. The method of claim 1, wherein the type of frame and reference outline correspond to specifications input by a user.

5. The method of claim 1, wherein the step of performing photography includes:

allowing a user to aim the camera and set a zoom factor.

6. The method of claim 5, wherein the zoom may be an optical or digital zoom.

7. The method of claim 1, wherein the step of performing photography includes:

taking a digital photograph.

8. The method of claim 1, wherein the method further comprises:

enlarging or contracting the detection area.

9. The method of claim 8, wherein the detection area is enlarged or contracted based on user input.

10. A method of controlling operation of a digital camera to take an identification photograph in a natural setting, the method comprising:

allowing a user to input specifications corresponding to type of frame and reference outline for the identification photograph;

displaying the corresponding frame and the corresponding reference outline in a display unit;

allowing the user to aim the camera and set a zoom factor;

taking a digital photograph;

displaying a detection area adjacent to the reference outline;

enlarging, contracting, or maintaining the detection area;

detecting an outline of a figure within the detection area;

deleting a background area of the photographed image with respect to the detected outline; and the detection area encompasses the reference outline, such that a portion of the detection area is within an area defined by the reference outline, and another portion of the detection area is outside of the area defined by the reference outline.

11. The method of claim 1, wherein the detecting step comprises:

detecting the outline of the figure based on pixels having a relatively greater gradation difference among pixels in the detection area.

12. The method of claim 10, wherein the detecting step comprises:

detecting the outline of the figure based on pixels having a relatively greater gradation difference among pixels in the detection area.

* * * * *

UNITED STATES PATENT AND TRADEMARK OFFICE
CERTIFICATE OF CORRECTION

| | | |
|---|---|---|
| PATENT NO. | : 7,321,393 B2 | Page 1 of 1 |
| APPLICATION NO. | : 10/716009 | |
| DATED | : January 22, 2008 | |
| INVENTOR(S) | : Min-ju Kim | |

It is certified that error appears in the above-identified patent and that said Letters Patent is hereby corrected as shown below:

In Claim 1, Column 6, line 5, after "and" insert --detecting an outline of a figure within the detection area--.

In Claim 10, Column 6, line 50, after "and" insert --inserting a background image for the identification photograph in the deleted background area--.

Signed and Sealed this

Twenty-seventh Day of May, 2008

JON W. DUDAS
*Director of the United States Patent and Trademark Office*